P. HANSON.
BUTTER MAKING MACHINE.
APPLICATION FILED OCT. 11, 1911.
1,095,728.
Patented May 5, 1914.
3 SHEETS—SHEET 2.
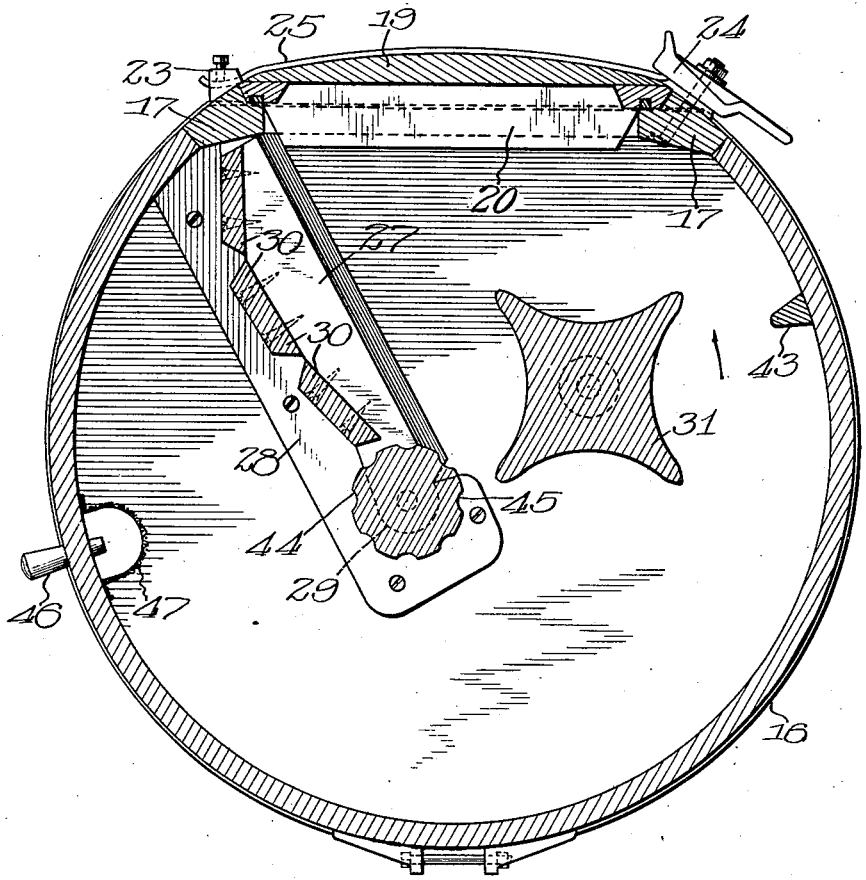
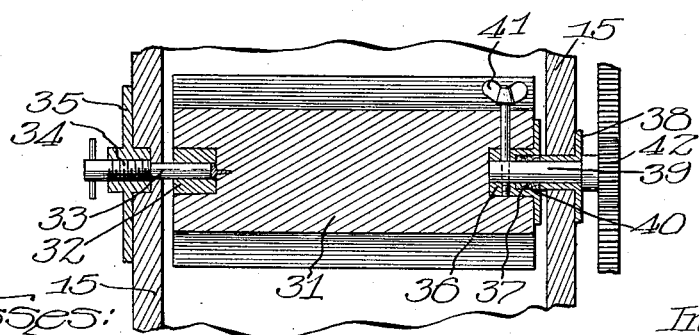

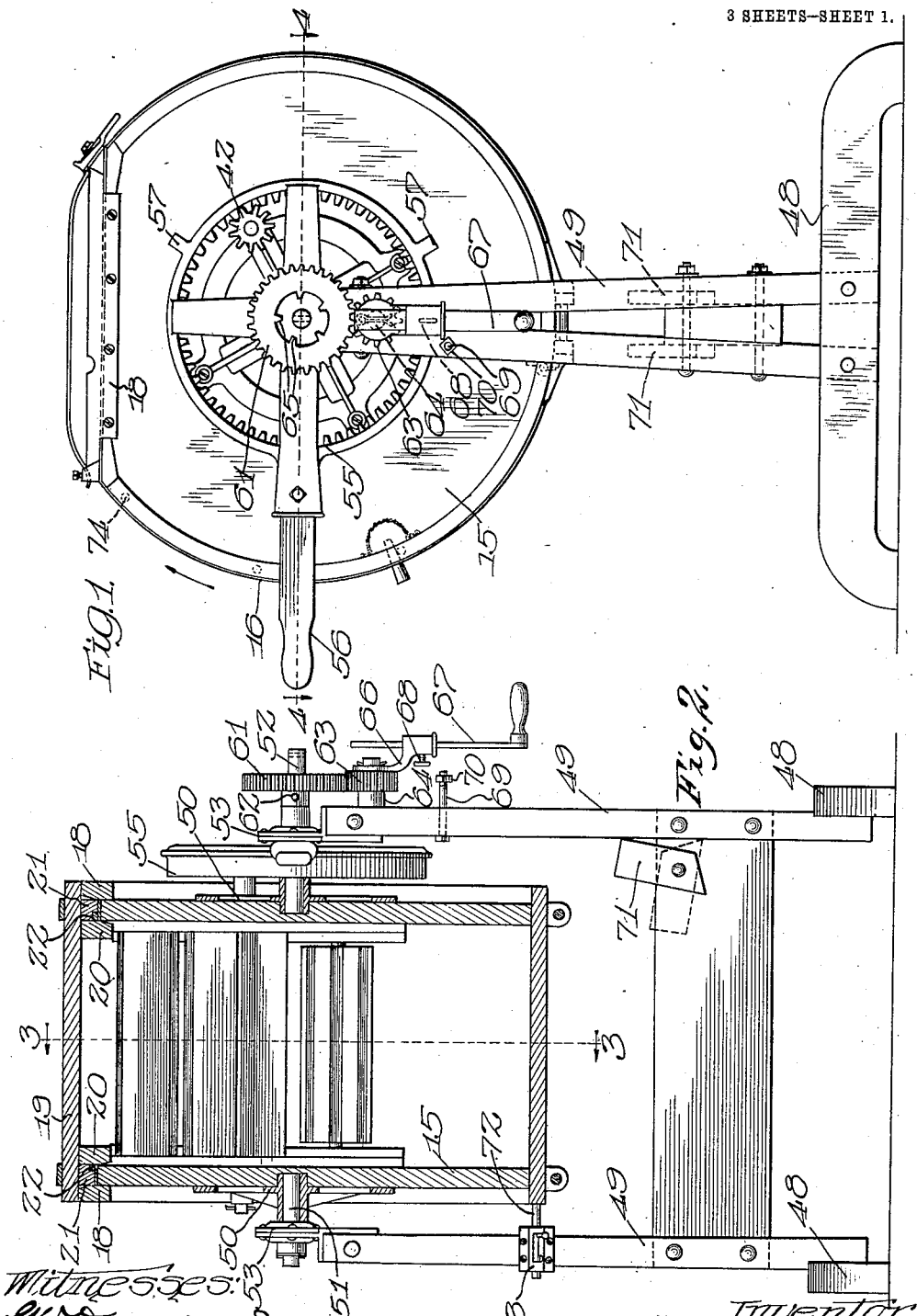

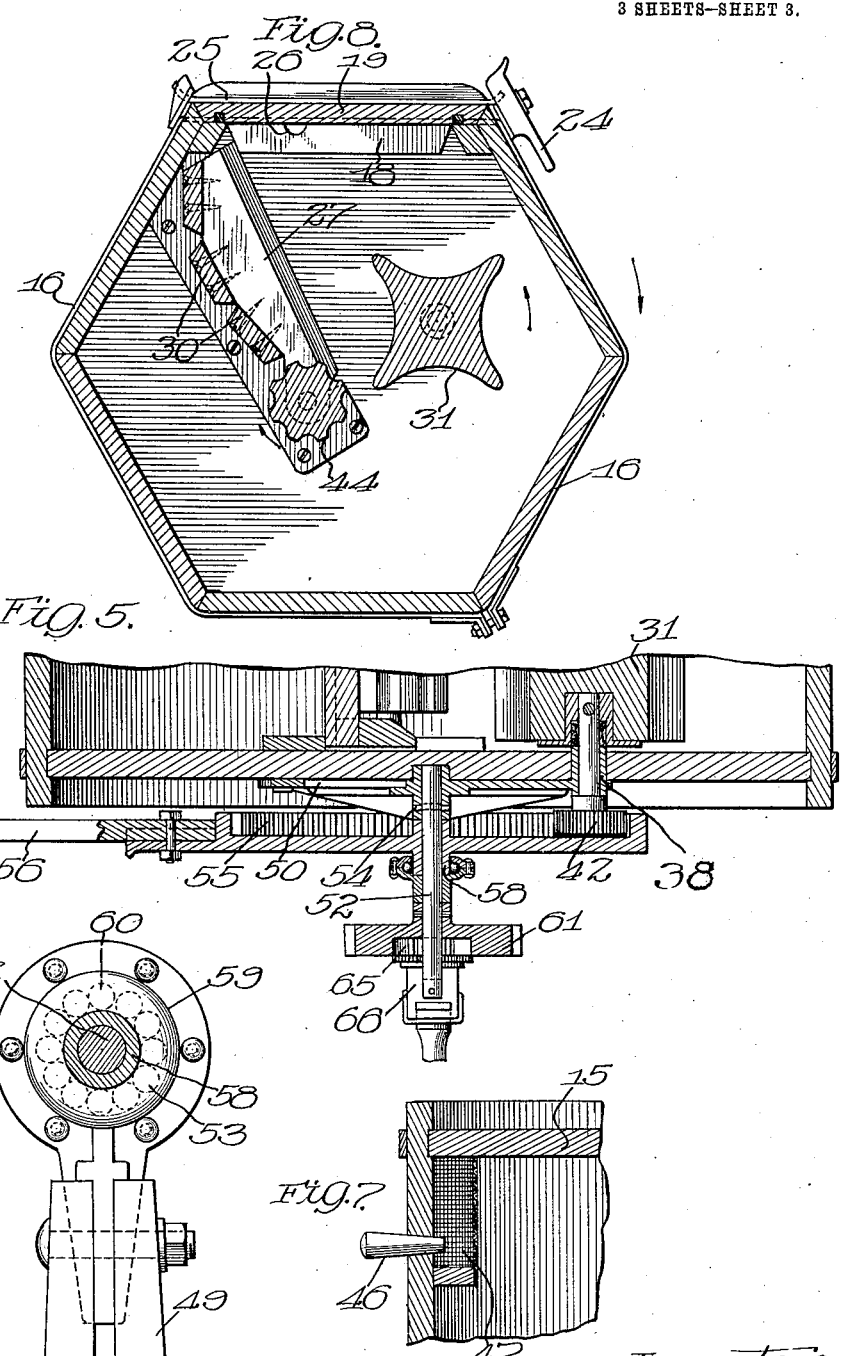

UNITED STATES PATENT OFFICE.

PAUL HANSON, OF WILD HORSE, COLORADO.

BUTTER-MAKING MACHINE.

1,095,728. Specification of Letters Patent. Patented May 5, 1914.

Application filed October 11, 1911. Serial No. 654,026.

*To all whom it may concern:*

Be it known that I, PAUL HANSON, a citizen of the United States, residing at Wild Horse, in the county of Cheyenne and State of Colorado, have invented certain new and useful Improvements in Butter-Making Machines, of which the following is a specification.

This invention relates to butter making machines, and is more particularly described as a hand churn and butter working machine.

The principal object of the invention is to provide a device of the class described, which may be utilized both as a churn and as a butter working machine, and which is provided with driving means that may be varied in accordance with the power which it is desired to exert in operating the machine.

A further object of the invention is to provide an improved, simple and cheap device of the class described, which is effective and efficient in operation.

For the attainment of these ends, and the accomplishment of other new and useful objects, as will appear, this invention consists in the features of novelty in the construction, combination and arrangement of the several parts generally shown in the accompanying drawings and described in the specification, but more particularly pointed out in the appended claims.

In the drawings, Figure 1 is an elevation of a machine constructed in accordance with the principles of my invention; Fig. 2 is a side elevation partly in cross section of the machine shown in Fig. 1; Fig. 3 is a cross sectional view through the receptacle on the line 3—3 of Fig. 2; Fig. 4 is a detail sectional view of the butter working roller and its mounting; Fig. 5 is a detail plan view of the gearing and operating devices, taken on the line 4—4 of Fig. 1; Fig. 6 is a detail view of one of the anti-friction bearings; Fig. 7 is a detail view of an outlet opening; Fig. 8 illustrates a modified form of the receptacle.

In a butter making machine, it is desirable to provide means not only for churning the cream in a receptacle, but also for providing means to work the butter after it is formed, without removing it from the machine. The agitation of the cream in a liquid form is very different from the operation of working butter in a more or less solid form, and the power which must be expended in rotating the receptacle under the different conditions, is much different. In working the butter it has been found more practical to provide a butter working roller or rollers, and at times, it is desirable to change the movement of the machine from a rotative to a rocking motion. Furthermore, it requires more power to operate the machine as a butter working machine, and in the present invention improved means are provided for operating the butter working roller.

Referring now more particularly to the drawings, a receptacle 15, which may be of any desired or suitable form and construction but which, in the present exemplification of the invention is round, is provided with an opening to facilitate the insertion and removal of material from the receptacle and with binding hoops or wires 16 which extend around the periphery of the receptacle. The opening in the receptacle is preferably made by removing or omitting a segment of the receptacle and fitting the opening thus formed with jamb members 17 and 18. These jamb members preferably form a plane opening in which a cover or lid 19 is adapted to fit. This lid 19 is formed with depending ribs 20 and 21, the latter of which is formed with a groove to receive a strip of packing material 22. This lid 19 may be held in place upon the jamb members in any suitable manner, such for example, as by means of the clamping devices shown more clearly in Figs. 1 and 3, and comprising a hinge member 23 at one side of the lid 19 and a locking lever 24 at the other side. Passing over the lid is a rod or bar 25 which is adapted to be engaged at one end by the hinge member 23, and engaged at the other end by means of the locking lever 24. This binds the lid securely in place upon the receptacle and forces the packing firmly against the jambs to make a substantially air-tight closure. The jambs 18 may be and preferably are provided with semi-circular seats or depressions 26 which may be used to position a cream tempering device which is removably inserted within the receptacle.

Disposed within the receptacle is a shelf 27 which is removably positioned in the opposite ends of the receptacle by means of the supports 28. These supports extend from the outer edge of the receptacle preferably adjacent one side of the lid opening transversely thereof, to a point in proximity to the center of the receptacle. The inner end of the support 28 is provided with a rounded opening 29 which is adapted to receive one end of each of the cross pieces of the shelf. The other ends of these cross pieces extend to the lid opening and are engaged by the ribs 20 of the lid to hold the shelf in position. It will be evident that by binding the outer side of the shelf, the shelf will be held firmly in position whenever the lid is on the receptacle, and as soon as the lid is removed, the shelf is freely removable from within the receptacle. This shelf 27 is preferably formed with a plurality of strips 30 which are spaced apart and secured to cross members at the ends. The object of this construction is to permit the fluid in the receptacle to pass through the openings between the strips.

A butter working roller 31 is disposed within the receptacle and is provided with means extending without the receptacle for separately rotating the roller. The construction of this roller is shown more clearly by Fig. 4. In one end of the roller there is disposed a bearing block 32 into which extends a shaft 33. This shaft is provided with a threaded portion 34 which is mounted in an end casting 35 secured to the receptacle. At the other end of the roller is a bearing member 36 provided with a central opening 37, and in the adjacent end of the receptacle 16, is a bearing casting 38 having a sleeve portion which extends inwardly and into the opening 37. A shaft 39 extends through the bearing members 36 and 38 and surrounding the shaft between these members is packing 40. The shaft 39 may be secured to the roller 31 in any suitable or desired manner, such for example, as by means of a thumb screw 41 extending from the surface of the roller, and at the outer end of the shaft 39 is a gear 42, by means of which the roller may be rotated. It will be evident from this construction that the rotation of the shaft 33 will cause a movement of the roller 31 in the direction of the other end so that the packing 40 will be compressed about the shaft 39 to prevent the escape of fluid through the shaft opening.

To assist in agitating the material placed within the receptacle, there may be provided a projection 43 extending inwardly from the surface of the receptacle, and to assist in working the butter, a roller 44 is provided which is preferably mounted between the end members of the shelf 27. This roller is provided with depressions 45 in its surface which are adapted to engage the material, and the roller is freely rotatable so that the butter working roller 31 in pressing the butter against it, will cause it to rotate in either direction corresponding to the movement of the roller 31. An outlet plug 46 and a screen of reticulated material 47 are provided to permit the more watery material to be withdrawn from the receptacle.

To support the receptacle, there are provided base members 48 from which there extend the standards 49. These standards are provided at their upper ends with bearing means for supporting the receptacle. At each end of the receptacle are bearing plates 50, which are secured to the receptacle and are adapted to provide bearing supports for shafts 51 and 52. These shafts may be provided with antifriction bearing members 53 mounted upon the standards 49, and these bearing devices may be of any desired or suitable construction. The shaft 52 is secured to one of the end plates 50 by means of a pin 54, and mounted upon the shaft 52 adjacent this end bearing plate 50, is an internally toothed gear 55 which is adapted to mesh with the gear 42 of the butter working roller. It will be noticed that this gear 55 is free to rotate upon the shaft 52, and that it is also provided with a hand lever 56 and with depending lugs 57. A portion of the gear adjacent the shaft 52 extends outwardly to form a sleeve portion 58 (see Fig. 5), and it is upon this sleeve portion that one of the anti-friction bearing devices 53 is positioned, so that the rotation of the gear 55 is made as free as possible. By reference now to Fig. 6 it will be seen that the bearing device 53 which comprises a pair of ball races 59, is secured to the standards 49 and is adapted to receive the sleeve 58 within which is the shaft 52, a number of ball bearings 60 being disposed in the ball races about the sleeve 58. This facilitates the movement of the sleeve and also reduces the friction of the entire receptacle when rotated about its bearings.

Mounted upon the shaft 52 is a gear 61 secured to the shaft by means of a pin 62. Meshing with this gear 61 is a pinion 63 which is mounted on a countershaft 64 supported by one of the standards 49. The outer surface of the gear 61 is formed with an opening in which are lugs or teeth 65 to engage the teeth of the pinion 63. The pinion 63 is removable from the counter-shaft 64, and may be placed upon the shaft 52. When in this latter position, it may be pressed inwardly until the teeth 65 register with the openings between the teeth of the pinion and locks the pinion to the gear 61. Secured to this pinion 63 is a bracket 66 which is adapted to receive the adjustable hand lever 67 and is provided with a thumb screw 68 to secure the lever 67 in position. It will be evident from this description that the pinion 63 may be removed from the countershaft 64 and placed upon the shaft 52 in driving engagement with the gear 61.

Disposed in one of the standards 49 is a locking bolt 69 provided with a locking nut 70 which is adapted to engage the lugs 57 formed on the outside of the gear 55. By locking this gear in connection with one of the standards, the rotation of the gear 55 is prevented, which when the receptacle 15 is being rotated, will result in the rotation of the butter making roller 31 by means of the gear 42 rolling around the inside of the gear 55. Another means for locking the gear 55 is provided which consists of movable detents 71 which are secured to a portion of the supporting frame, and between which the end of the hand lever 56 may be engaged. From this it will be seen that when the gear 55 is not locked in position with respect to the standards 49, the rotation of the receptacle 15 by means of the hand lever 67, will cause the rotation of the gear 55 at the same speed, for the reason that the friction produced by the rotation of this gear 55, is not sufficient to overcome the friction caused by the rotation of the butter working roller within the receptacle, and consequently, the rotation of the receptacle causes the rotation of the butter working roller 31 about the axis of the receptacle without any rotation of the butter working roller about its own axis. When, however, it is desired to rotate the butter working roller at the same time, the receptacle is being rotated, it is necessary only to grasp the hand lever 56 in one hand or to lock it in fixed relation to the standards 49, in order to produce the rotation of the roller 31.

The butter working roller is disposed off center with respect to the axis of the receptacle (see Fig. 3), and substantially at right angles and in advance of the butter working shelf at the inner edge thereof, preferably on one side of the center of the receptacle and opposite the roller 44, substantially at right angles thereto on the one side of the center of the receptacle whereby a larger amount of material may be contained in the receptacle between the cradle and the butter working roller in proportion to the size of the receptacle than with any other simple arrangement of the shelf and roller and still effect a satisfactory and efficient working of the butter between the roller and the shelf.

If it is desirable to lock the receptacle in any position, this may be done by means of a locking device in connection with the standards 49. This locking device consists of a bolt 72 movable in a guide 73 to engage openings 74 in the surface of the receptacle. With the receptacle in locking position, it is possible to rotate the butter working roller alone by simply rotating the gear 55.

If desired, the receptacle may be constructed in the form shown by Fig. 8. This construction may be considered simpler and cheaper because of the fact that the receptacle is hexagonal instead of round. However, the form of receptacle makes no difference and any desired form or shape of receptacle may be used.

In operation, the material to be churned would first be placed in the receptacle and the lid secured in position. The pinion 63 will be placed upon the shaft 52 in engagement with the gear 61, and the hand lever 67 would be rotated to rotate the shaft 52 and the receptacle, directly at any desired rate of speed. At this time, the gear 55 is preferably free upon the shaft 52 and as the shaft is rotated, the gear 55 also rotates. This produces no rotation of the butter working roller 31 upon its own axis, and the material within the receptacle is simply agitated as the receptacle is rotated. When the butter fats are separated somewhat from the rest of the material within the receptacle, it may be stopped and the buttermilk may be discharged through the plugged opening in the surface of the receptacle without removing the other materials from within the receptacle. At this time, if desired, salt and coloring or other materials may be added to the butter fats and the butter working operation begun. If the butter working operation becomes too hard with the pinion 63 on the shaft 52, the pinion may be removed from the shaft 52 and placed upon the countershaft 64, where it will be in driving connection with the gear 61. In this position the shaft 52 will be operated at a slower speed and more power can be obtained. The gear 55 may now be locked in any of the above described methods or may be held by the hand of the operator, which will result in the rotation of the butter working roller 31. After the butter has been worked in this fashion for a time, the receptacle 15 may be rotated until the butter lies upon the shelf in the receptacle and in this position, it may be worked to and fro without entirely rotating the receptacle 15, and with or without rotating the butter working roller 31. From this it will be evident that the entire butter making operation may be performed in the one machine without handling the materials except in removing the completed product.

While I have thus described the preferred embodiment of my invention, it is evident that others skilled in the arts to which this appertains, may make various changes in the construction, combination and arrangement without departing from the spirit and scope of the invention.

What I claim is:

1. A butter making machine comprising a rotatable receptacle, butter working members within the receptacle, a hand lever for rotating the receptacle, and additional means in connection with the receptacle to rotate it in working the butter.

2. A butter working machine comprising a receptacle, a butter working shelf disposed therein with its inner edge adjacent the center of the receptacle, and a butter working roller disposed in the receptacle in advance of the shelf and substantially at right angles to the shelf at the inner edge thereof.

3. A butter making machine comprising a receptacle, a butter working roller within the receptacle, and gearing connected to the receptacle and the said roller whereby the receptacle can be rotated, and the said roller may be rotated when the receptacle is maintained in a stationary position.

4. A butter working machine comprising a receptacle, a butter working shelf disposed therein with its inner edge located on one side of the axis of the receptacle, and a butter working roller disposed in the receptacle on the opposite side of the axis thereof and opposite the said edge of the shelf.

5. A butter working machine comprising a receptacle, a butter working shelf disposed therein with its inner edge located on one side of the axis of the receptacle, and a butter working roller disposed in the receptacle and mounted upon an axis off center with respect to the receptacle axis on the side opposite the inner edge of the shelf.

6. A butter making machine comprising a receptacle, a butter working roller within the receptacle, the roller being rotatable about a separate axis, gearing connected to the receptacle and to the roller, the said gearing being operative to rotate the receptacle and the roller about the axis of the receptacle, and a detent for part of the gearing, the gearing being then operative to rotate the roller at a different speed and in a direction opposite to that of the receptacle.

7. In a machine of the class described, the combination with a receptacle having end members spaced apart and an opening extending the entire length of the receptacle, a removable shelf, supporting means for the shelf disposed in the end members and a cover for said opening effective to bind the shelf in position.

8. In a machine of the class described, the combination with a receptacle having end members spaced apart, a removable shelf, supporting means for the shelf disposed in the end members and a removable cover for the receptacle provided with inwardly projecting means which engages the shelf and binds it in position.

9. In a machine of the class described, the combination with a receptacle, of a shelf comprising a number of cross pieces spaced apart, means within the receptacle to support the shelf in position in the receptacle, and a removable cover for the receptacle having an inward projection which engages one side of the shelf and binds the shelf removably in position.

10. In a machine of the class described, the combination with a receptacle, a shelf comprising a number of cross pieces spaced apart, and a roller disposed on the inner side of the shelf, supporting means for the shelf disposed transversely in opposite ends of the receptacle and adapted to engage the inner side of the shelf at the ends, and means to engage the outer side of the shelf to hold it in position.

11. In a machine of the class described, the combination with a receptacle, of a removable shelf having a freely rotatable roller, a butter working roller disposed within the receptacle, and adjusting means for the roller comprising a bearing member disposed at one end of the roller mounted in the end of the receptacle and provided with means to move the roller longitudinally, a bearing member in the other end of the receptacle extending within the receptacle, a bearing member in the adjacent end of the roller having an opening to receive the extending end of the bearing member, a shaft extending through said bearing members, and secured to the shaft, packing disposed in the inside bearing member, the said means at the other end of the roller being operative to compress the packing material about the shaft.

12. In a churn and butter worker, the combination with a receptacle, of a roller mounted therein parallel to the axis of the drum, means to rotate the receptacle and the roller, and separate means to effect the rotation of the roller independent of the rotation of the receptacle.

13. In a churn and butter worker, the combination with a receptacle, of a roller having a gear secured to its shaft and disposed without the receptacle, and a shaft to rotate the receptacle and the roller about the shaft as an axis, a toothed member freely mounted upon the shaft and meshing with the roller gear, and means to stop the said toothed member, the said member being operative to effect the rotation of the roller about its own axis at the same time the said shaft is rotated.

14. In a churn and butter worker, the combination with a receptacle provided with a shaft for rotating it, a butter working roller mounted within the receptacle and having a gear positioned upon its shaft without the receptacle, a gear freely rotatable upon the shaft of the receptacle and meshing with the roller gear, means to rotate the shaft of the receptacle, a hand lever to stop and rotate the freely rotatable gear independent of the rotation of the receptacle shaft, a relative difference in speed between the said gear and the receptacle shaft being effective to produce rotation of the butter working roller.

15. In a machine of the class described, the combination with a receptacle rotatably mounted upon a shaft in bearing standards, of a roller mounted in the receptacle and provided outside thereof with a gear for rotating it, a gear freely mounted upon the receptacle shaft and provided with lugs, and means in connection with the bearing standards to engage the lugs and to hold the said gear stationary.

16. In a machine of the class described, the combination with a receptacle rotatably mounted upon a shaft in bearing standards, of a roller mounted in the receptacle and provided inside thereof with a gear for rotating it, a gear freely mounted upon the receptacle shaft and provided with a hand lever to rotate the gear, and stops in connection with the bearing standards on one side of the receptacle to engage the end of the hand lever in its lowermost position whereby it cannot be moved in either direction.

17. In a machine of the class described, the combination with a receptacle, of bearing standards therefor, a shaft for rotatably mounting the receptacle in the standards, means to engage the receptacle with the standards at one end thereof, a butter working roller rotatively mounted in the receptacle, and means to rotate the butter working roller independent of the position of the receptacle, comprising a freely rotatable gear mounted upon the receptacle shaft, and means to engage the said roller.

18. In a machine of the class described, the combination with a receptacle, of bearing standards therefor, a shaft for rotatably mounting the receptacle in the standards, a gear wheel fixed to the shaft, a countershaft, a pinion removably mounted upon the countershaft and meshing with the said gear wheel, the said gear wheel being provided with an opening in the outer side to engage the said pinion when it is positioned upon the same shaft, and a hand lever secured to the said pinion.

19. The combination with a rotatable receptacle, of a shaft therefor, a member rotatable therein upon a second shaft, a gear secured to said second shaft outside of the receptacle, an internally toothed gear meshing with the gear on the second shaft, said internal gear being free on the shaft and provided with a hand lever to move it about the shaft, and a hand lever secured to the first named shaft, whereby the two levers may be rocked to rock the receptacle to and fro and to rotate the second shaft.

20. The combination with a receptacle, of bearing standards therefor, bearing plates secured to the ends of the receptacle, shafts mounted therein and in the said standards, one of said shafts being provided with a crank for rotating the receptacle, a butter working roller within the receptacle, a gear for rotating the same disposed without the receptacle, a gear freely mounted upon the receptacle shaft and meshing with the roller gear, the said freely rotatable gear being provided with a hand lever and an extending sleeve portion, an anti-friction bearing secured to one of the standards and surrounding the sleeve portion of the said gear whereby it may be freely rotated with the hand lever, and a hand lever for direct and indirect connection to the receptacle shaft, the two hand levers being operative to effect the rotation of the receptacle and the butter working roller independently and in conjunction, and to permit a roll of butter to be worked to and fro within the receptacle.

21. In a machine of the class described, the combination with a receptacle having an opening extending the entire length of the receptacle with the edges disposed in the same plane, and a removable flat door for said opening.

22. In a machine of the class described, the combination with a receptacle having an opening extending the entire length of the receptacle with the edges disposed in the same plane, a removable butter working shelf disposed with one edge adjacent the edge of the door opening and the other edge on one side of the axis of the receptacle, a removable butter working roller disposed on the other side of the axis of the receptacle opposite the inner edge of the shelf, and a flat cover for said opening in the receptacle, the opening being of a length to permit the removal of the shelf and roller and the insertion of cream tempering devices and the like.

In testimony whereof I have signed my name to this specification, in the presence of two subscribing witnesses, on this 6th day of October, A. D. 1911.

PAUL HANSON.

Witnesses:
 JOHN A. PEARSON,
 WALTER H. GUTSCHE.

---

Copies of this patent may be obtained for five cents each, by addressing the "Commissioner of Patents, Washington, D. C."